(12) United States Patent
Khosravi et al.

(10) Patent No.: US 11,387,756 B1
(45) Date of Patent: Jul. 12, 2022

(54) MOTOR CONTROLLER WITH STALL DETECTION

(71) Applicant: Allegro MicroSystems, LLC, Manchester, NH (US)

(72) Inventors: Kamyar Khosravi, Manchester, NH (US); Masahira Kurihara, Prague (CZ); Andrew Adib, Musselburgh (GB)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 17/161,780

(22) Filed: Jan. 29, 2021

(51) Int. Cl.
*H02P 21/14* (2016.01)
*H02P 21/10* (2016.01)
*H02P 27/12* (2006.01)
*H02P 21/22* (2016.01)
*H02P 21/13* (2006.01)

(52) U.S. Cl.
CPC .............. *H02P 21/14* (2013.01); *H02P 21/10* (2013.01); *H02P 21/13* (2013.01); *H02P 21/22* (2016.02); *H02P 27/12* (2013.01)

(58) Field of Classification Search
CPC ......... H02P 29/024; H02P 21/14; H02P 27/12
See application file for complete search history.

(56) References Cited

U.S. PATENT DOCUMENTS

| | | | |
|---|---|---|---|
| 5,329,214 A | 7/1994 | Williamson et al. | |
| 7,590,334 B2 | 9/2009 | Yabusaki et al. | |
| 7,747,146 B2 | 6/2010 | Milano et al. | |
| 8,093,844 B2 | 1/2012 | Milesi et al. | |
| 9,203,339 B2 | 12/2015 | Sato | |
| 9,214,884 B2 | 12/2015 | Sonoda et al. | |
| 9,735,773 B2 | 8/2017 | McIntosh et al. | |
| 9,929,683 B2 | 3/2018 | Sonoda et al. | |
| 10,348,223 B1 | 7/2019 | Khosravi et al. | |
| 2009/0273308 A1* | 11/2009 | Matsuo | H02P 21/0003 318/450 |
| 2017/0141712 A1 | 5/2017 | Royak et al. | |
| 2018/0367073 A1 | 12/2018 | Haas | |

(Continued)

FOREIGN PATENT DOCUMENTS

| | | | |
|---|---|---|---|
| CN | 108111082 A | * 6/2018 | ............. H02P 21/18 |
| JP | 2010081746 A | 4/2010 | |

OTHER PUBLICATIONS

U.S. Appl. No. 16/720,531, filed Dec. 19, 2019, Lesser et al.

(Continued)

*Primary Examiner* — Said Bouziane
(74) *Attorney, Agent, or Firm* — Daly, Crowley, Mofford & Durkee, LLP (57) ABSTRACT

A motor control system for controlling operation of a motor having a plurality of windings includes a gate driver to provide a control signal to one or more switching elements controlling a voltage applied to the plurality of windings and a Field Oriented Control (FOC) controller configured to generate a PWM signal for coupling to the gate driver, wherein the FOC controller comprises a d-axis control loop configured to generate an applied d-axis voltage and a q-axis control loop configured to generate an applied q-axis voltage. A stall detector is configured to calculate an estimate of the q-axis voltage and compare the applied q-axis voltage to a threshold based on the estimate in order to detect a stall condition of the motor.

20 Claims, 3 Drawing Sheets

(56) References Cited

U.S. PATENT DOCUMENTS

2020/0021212 A1  1/2020  Yamada et al.
2020/0028456 A1  1/2020  Morioka et al.
2021/0091692 A1  3/2021  Lu

OTHER PUBLICATIONS

Allegro MicroSystems, LLC Datasheet "AMT49400, Integrated Sensorless FOC BLDC Driver", Rev. 2, Jun. 10, 2019, 15 pages.
Texas Instruments Datasheet "DRV10983, DRV10983Z, DRV10983 12- to 24-V, Three-Phase, Sensorless BLDC Motor Driver", SLVSCP6H, Jul. 2014, 61 pages.
Search Report and Written Opinion dated Apr. 8, 2022 for PCT Application No. PCT/US2021/064273; 15 pages.

\* cited by examiner

MOTOR CONTROLLER WITH STALL DETECTION

CROSS-REFERENCE TO RELATED APPLICATIONS

Not Applicable.

STATEMENT REGARDING FEDERALLY SPONSORED RESEARCH

Not Applicable.

FIELD

This disclosure relates generally to motor controllers and more particularly to stall detection in sensorless Field Oriented Control (FOC) motor controllers.

BACKGROUND

As is known, various types of control systems are used to implement motor control in a variety of applications. For example, in some motor control systems, electromotive force, or back-EMF (BEMF), produced by the spinning motor is measured to determine the position and/or speed of the motor and is fed back to the controller.

In other motor control systems, referred to as vector control or Field Oriented Control (FOC) systems, stator current is controlled in order to thereby control the strength of the magnetic field within the motor to maintain the magnetic field orthogonal with respect to rotor flux. The so-called d-axis, or direct axis, can correspond to the position of the motor and the q-axis, or quadrature axis, is perpendicular to the d-axis. In order to rotate the motor, the applied magnetic field is maintained perpendicular to the d-axis. FOC improves efficiency by providing maximum torque at a given speed with minimum power consumption.

Regardless of the control methodology, some motor control systems employ separate sensors to detect the position and/or speed of the motor for use by the controller. These types of systems can be referred to as "sensor-based" systems. One motor type that generally employs a sensor-based control system is a permanent magnet synchronous motor (PMSM).

In other motor control systems, separate sensors are not used to detect the motor position and/or speed and thus, are sometimes referred to as "sensorless systems." Such systems include electronic circuitry to estimate motor position and/or speed. One motor type that often employs sensorless control is a brushless DC motor (BLDC).

Motors and their control systems are widely used in automobiles and other safety critical applications. There are a variety of specifications that set forth requirements related to permissible motor control quality levels, failure rates, and overall functional safety.

Electric motors may occasionally stall. For example, an electric motor can become stuck in a particular position or vibrate back and forth (i.e., wobble) due to unexpected load conditions. The ability to correct a stall condition is dependent on accurate detection of the condition.

SUMMARY

Described herein are motor control apparatus and techniques for detecting motor stall conditions in an FOC control system. Detection is based on comparison of the applied q-axis voltage Vq to one or more thresholds that are generated based on a calculated estimate of the q-axis voltage $Vq^E$. Advantages of the described arrangements include stall detection during motor wobbling, detection of inaccurate sensorless control frequency lock, independence from motor parameter variation error (since a motor inductance parameter is not used to estimate the q-axis voltage), relatively low computational intensity and complexity, and improved detection accuracy under start-up and fast transient conditions by using debounce functionality.

According to the disclosure, a motor control system for controlling operation of a motor having a plurality of windings includes a gate driver to provide a control signal to one or more switching elements controlling a voltage applied to the plurality of windings, a Field Oriented Control (FOC) controller, and a stall detector. The FOC controller can be configured to generate a PWM signal for coupling to the gate driver and can include a d-axis control loop configured to generate an applied d-axis voltage and a q-axis control loop configured to generate an applied q-axis voltage. The stall detector can be configured to calculate an estimate of the q-axis voltage and compare the applied q-axis voltage to a threshold based on the estimate in order to detect a stall condition of the motor.

Features may include one or more of the following individually or in combination with other features. The stall detector may include a threshold generator configured to generate a high threshold and a low threshold based on the estimate of the q-axis voltage for comparison to the applied q-axis voltage. The stall detector may further include a timer and the stall detector may be configured to reset the timer if the applied q-axis voltage becomes less than the high threshold or greater than the low threshold. The stall condition of the motor can be detected if the applied q-axis voltage remains greater than the high threshold or less than the low threshold for more than a predetermined timeout interval of the timer. The stall detector can be configured to generate a stall signal indicating the stall condition of the motor in response to detection of the stall condition. The stall detector can include a debounce filter configured to generate the stall signal. The stall detector can be configured to calculate the estimated q-axis voltage according to the following: $V_q^E = RI_q + W_r K_t$, where $W_r$ is an observed motor speed, $K_t$ is a BEMF constant, $I_q$ is the applied q-axis current, and R is a motor phase resistance. The FOC controller can include a position and frequency observer configured to generate a motor position estimate θ and the observed motor speed $W_r$. A current measurement circuit can be coupled to one or more of the plurality of windings to measure a current through the windings. Each of the d-axis control loop and the q-axis control loop of the FOC controller can include a Proportional-Integral (PI) unit.

Also described is a method of detecting a stall condition in a motor having a plurality of windings, the method including applying a controlled voltage to the plurality of windings, measuring a current through the one or more of the plurality of windings, and generating, with a Field Oriented Control (FOC) controller that includes a d-axis control loop configured to generate an applied d-axis voltage and a q-axis control loop configured to generate an applied q-axis voltage, a PWM signal for coupling to a gate driver that is configured to apply the controlled voltage to the plurality of windings. The method may further include calculating an estimate of the q-axis voltage, comparing the applied q-axis voltage to a threshold based on the estimate, and detecting a stall condition of the motor based on the comparison.

Features may include one or more of the following individually or in combination with other features. The method may further include generating the threshold based on programable variables. Generating the threshold may include generating a high threshold based on a high programmable variable and generating a low threshold based on a low programmable variable. Detecting the stall condition may include resetting a timer when the applied q-axis voltage becomes less than the high threshold or greater than the low threshold. The stall condition of the motor can be detected if the applied q-axis voltage remains greater than the high threshold or less than the low threshold for more than a predetermined timeout interval of the timer. The method may further include generating a stall signal indicating detection of the stall condition. Generating the stall signal can include using a debounce filter. Calculating the estimated q-axis voltage may include using the following: $V_q^E = RI_q + W_r K_t$ where $W_r$ is an observed motor speed, $K_t$ is a BEMF constant, $I_q$ is the applied q-axis current, and R is a motor phase resistance.

Also described is a motor control system for controlling operation of a motor having a plurality of windings, the motor control system including a Field Oriented Control (FOC) controller configured to generate a PWM signal for coupling to the gate driver based on a received demand signal and including a d-axis control loop configured to generate an applied d-axis voltage and a q-axis control loop configured to generate an applied q-axis voltage and means for detecting a stall condition of the motor based on an estimate of the q-axis voltage. The stall condition detecting means may include means for calculating an estimate of the q-axis voltage, means for generating a threshold based on the estimate of the q-axis voltage, and means for comparing the applied q-axis voltage to the threshold.

DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Figure 1:
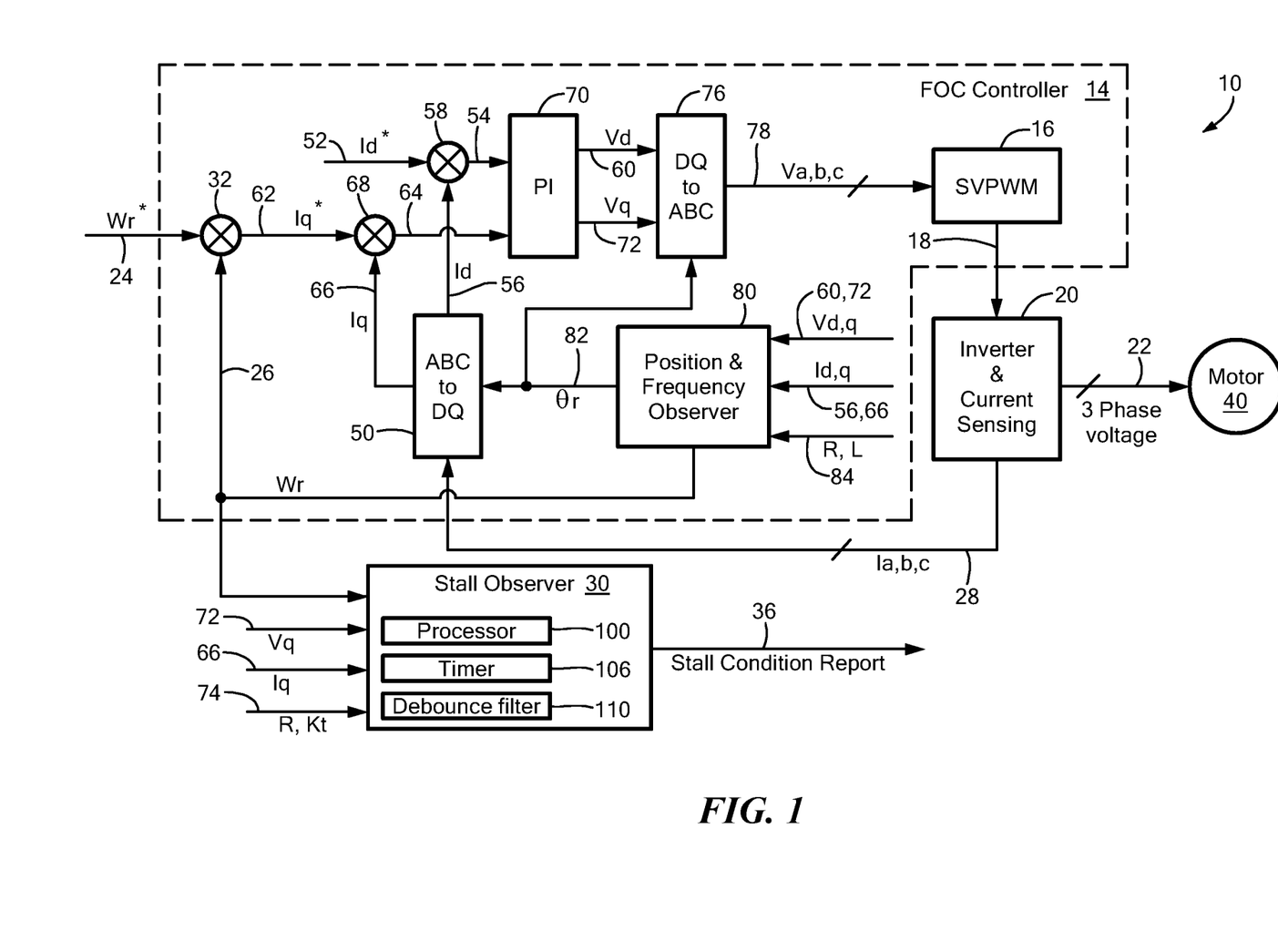
FIG. 1 is a simplified block diagram of a motor control system with stall detection according to the disclosure.

Referring to FIG. 1, a motor control system 10 includes an FOC controller 14, an inverter and current sensing block 20, and a stall observer 30 arranged control a motor 40. Motor 40 has a plurality of windings and voltages 22 are applied to the windings by the inverter block 20. The FOC controller 14 includes a d-axis control loop configured to generate an applied d-axis voltage Vd 60 and a q-axis control loop configured to generate an applied q-axis voltage Vq 72. A gate driver of the FOC controller 14 can include a Space Vector Pulse Width Modulation (SVPWM) block 16 that provides control signals 18 (i.e., PWM signals) to switches of the inverter block 20 to control the motor winding voltages 22 in order to achieve a desired speed corresponding to a user-provided speed demand signal Wr* 24.

According to the disclosure, stall observer 30 (referred to herein alternatively as stall detector 30) is configured to calculate an estimate of the q-axis voltage $Vq^E$, generate one or more thresholds based on the estimated q-axis voltage, and compare the applied q-axis voltage Vq to a threshold in order to detect a stall condition of the motor. The stall detector 30 can include a threshold generator configured to generate a high threshold $Vq^{EH}$ and a low threshold $Vq^{EL}$ for comparison to the applied q-axis voltage Vq. With this arrangement, stall conditions of the motor can be detected and a stall condition signal, or simply stall signal 36 can be generated to provide an indication of whether or not a stall condition has occurred. The stall signal 36 can be provided to circuits and systems configured to take action, such as turn off and/or restart the motor.

Current 28 through the motor windings can be measured by current sensing circuitry of block 20. Various circuity is possible for this purpose. For example, one or more sense resistors can measure the current 28 through one more motor windings. Such a so-called "shunt resistor" has a relatively low resistance to avoid significant effects on the motor current. It will be appreciated that it is not necessary to measure all three phase currents since the sum of the three phase currents equals zero and thus, the third current can be calculated as the negative sum of two measured winding currents.

The d-axis control loop of the FOC controller 14 can include a converter 50 responsive to the measured phase current 28 and also to an observed motor position signal $\theta_r$ 82, a summation element 58, and a Proportional-Integral (PI) control unit 70 in order to generate the applied d-axis voltage Vd 60. The observed motor position signal $\theta_r$ 82 is described further below, but suffice it to say here that this signal is representative of an estimate of the observed rotor position. The d-axis feedback current Id 56 can be coupled to summation element 58 with which a d-axis reference current signal 52 Id* can be summed with the feedback current (i.e., a difference is determined); however, in applications in which field weakening is not applied, the d-axis reference current signal 52 Id* can be set to zero. An output of the summation element 58 provides a signal 54 for coupling to the PI control unit 70. PI control unit 70 is configured to apply proportional integral control to signal 54 in order to generate the applied d-axis voltage signal Vd 60. Thus, when the d-axis reference current signal 52 Id* is zero, the signal 54 is equal to the d-axis feedback current Id 56 and the applied d-axis voltage 60 is a proportional integral representation of the d-axis feedback current Id 56.

The q-axis control loop of the FOC controller 14 can include converter 50, a summation element 68, and PI control unit 70 in order to generate the applied q-axis voltage signal Vq 72. More particularly, converter 50 generates a q-axis feedback current Iq 66 that controls motor torque output and can be coupled to summation element 68 with which a q-axis reference current signal Iq* 62 is compared to the q-axis feedback current signal Id 66 (i.e., a difference is determined) in order to generate a signal 64 for coupling to the PI control unit 70. The q-axis reference current signal 62 Iq* can be generated by taking a difference (e.g., with a summation element 32) between the speed demand signal Wr* 24 and an observed speed signal Wr 26. PI control unit 70 is configured to apply proportional integral control to signal 64 in order to generate the applied q-axis voltage signal Vq 72.

Converter 50 can implement Clarke transformation or other processing in order to convert the motor winding current Ia, b, c 28 into two-dimensional orthogonal stationary quantities $i_\alpha$, $i_\beta$ and can also apply a Park transformation to convert the two-axis stationary system $i_\alpha$, $i_\beta$ into a two-axis rotating system $i_q$, $i_d$, where the d-axis current is aligned with the rotor flux and the q-axis current (the torque-producing component) is orthogonal to the rotor flux. The observed motor position signal $\theta_r$ 82 is used by the converter 50 for the transformation from the three-phase motor winding current Ia, b, c 28 into the two-dimensional quantities $i_\alpha$, $i_\beta$.

A converter 76 is coupled to receive the applied d-axis voltage Vd 60, the applied q-axis voltage Vq 72, and the observed motor position signal $\theta_r$ 82 and is configured to convert these control signals from the d, q domain into three-phase motor control signals 78 for coupling to the SVPWM block 16. For example, converter 76 can implement an inverse Park transform to convert the two-axis rotating signals Vq, Vd into a stationary two-axis system and ultimately into three axis signals 78. With this arrangement, the outputs of the PI control unit 70 (i.e., the applied d-axis voltage signal Vd 60 and the applied q-axis voltage signal Vq 72) are rotated back into the stationary reference frame using the transformation angle to obtain quadrature voltage values, V$\alpha$ and V$\beta$. Voltages V$\alpha$ and V$\beta$ are then mathematically transformed back into three phase-voltages Va, Vb, and Vc, which determine the new PWM duty-cycle. The observed motor position signal $\theta_r$ 82 is used by the converter 76 for the transformation from the two-dimensional quantities V$\alpha$ and V$\beta$ into the three-phase voltages Va, Vb, and Vc 78.

Speed demand signal Wr* 24 can be a user provided input received from an external device and, in general, is indicative of a requested speed of motor 40. Speed demand signal Wr* 24 can be provided in a variety of formats, for example, a Single Edge Nibble Transmission (SENT) format, a Serial Peripheral Interface (SPI) format, a Local Interconnect Network (LIN) format, a CAN (Controller Area Network) format, an Inter-Integrated Circuit (I²C) format, or other signal formats. Speed demand signal Wr* 24 can be a voltage signal having a selected voltage value indicative of a desired speed of motor 40. Speed demand signal Wr* 24 may also be a pulse width modulated (PWM) signal having a selected duty cycle that represents the desired speed of motor 40. In embodiments in which speed demand signal Wr* 24 is a PWM signal, the duty cycle of the PWM control signals 18 may be proportional to the duty cycle of speed demand signal. Further, speed demand signal Wr* 24 can be a digital signal having a digital value representative of the desired speed of motor 40.

A position and frequency observer 80 can generate the observed motor position signal $\theta_r$ 82 and the observed speed signal Wr 26 in response to the applied d-axis voltage 60 and the applied q-axis voltage 72, the d-axis feedback current Id 56 and the q-axis feedback current Iq 66, and also in response to a motor resistance value R and a motor reluctance value L (labeled collectively 84). The motor resistance R and motor reluctance L can be user programmable, as may be based on specifications of the motor 40. Observer 80 may include neural network based "on-line" learning, a model reference adaptive system (MRAS), Kalman filters, an adaptive non-linear flux observer, and/or a sliding mode observer. As noted above, the observed motor position signal $\theta_r$ 82 can be used by converter 50 to provide a transformation angle for the signal conversions and the observed speed signal Wr 26 can be used to generate the q-axis reference current signal 62 Iq*.

As noted above, stall detector 30 is configured to calculate an estimate of the q-axis voltage $Vq^E$, generate one or more thresholds based on the calculated estimate of the q-axis voltage, and compare the applied q-axis voltage Vq 72 to the threshold in order to detect a stall condition of the motor. To this end, stall detector 30 can be responsive to the applied q-axis voltage Vq 72, the q-axis feedback current Iq 66, and also to a motor winding resistance value R and a bemf constant Kt (collectively labeled 74) as explained below.

Stall detector 30 can include a processor 100 with which the estimate of the q-axis voltage $Vq^E$ is calculated. The q-axis voltage $Vq^E$ can be estimated based on equation (1):

$$V_q^E = RI_q + W_r L_d I_d + W_r K_t + \rho L_q I_q \tag{1}$$

where R represents the resistance of a motor phase in ohms, Iq is the q-axis current 66 in amps, Wr is provided by the observed rotor speed signal 26 in radians/second, Ld is the d-axis inductance of one motor phase in Henrys as may be a user programmable value, Id is the d-axis current 56 in amps, Kt is a bemf constant in V/(rad/s) as may be a user programmable value, Lq is the q-axis inductance of one motor phase in Henrys as may be a user programmable value, and $\rho$ represents the rate of change (i.e., the derivative) of the product of Lq and Iq.

Equation (1) can be simplified by not applying field weaking (i.e., by setting $I_d^* = 0$) and by assuming no change in the Iq parameter at steady state (i.e., $\rho$ is approximately zero). The resulting simplified calculation of the estimate of the q-axis voltage $Vq^E$ is given by the following equation (2):

$$V_q^E = RI_q + W_r K_t \tag{2}$$

Advantageously, simplification of the calculation of the estimate of the q-axis voltage $Vq^E$ in this manner can minimize processing complexity and time in the microcontroller 100. It will be appreciated by those of ordinary skill in the art however, that the additional terms of equation (1) that drop out of equation (2) could, alternatively be used if desired.

Stall detector 30 can compute the estimate of the q-axis voltage $Vq^E$ at various times and rates, such as once per motor control cycle (i.e., PWM cycle). In an example embodiment, such an update rate can be between approximately 15 KHz and 35 KHz. It will be appreciated by those of ordinary skill in the art however, that this range is an example only and can be varied to suit particular application requirements. The q-axis voltage estimate thus computed can be stored in a memory, such as an EEPROM.

Processor 100 can generate one or more thresholds, or threshold values to which the applied q-axis voltage Vq 72 can be compared. For example, processor 100 can generate a high threshold $Vq^{EH}$ and a low threshold $Vq^{EL}$ based on the estimated q-axis voltage $Vq^E$. In embodiments, the high and low thresholds can be generated as follows:

$$Vq^{EH} = K_H * Vq^E \tag{3}$$

$$Vq^{EL} = K_L * Vq^E \tag{4}$$

where $K_H$ and $K_L$ are high and low threshold variables, respectively. As an example, $K_H$ can be between 1.0 and 3.0 and $K_L$ can be less than one. In some embodiments, the high and low threshold variables $K_H$ and $K_L$ can be tuned during manufacture. For example, these variables $K_H$ and $K_L$ can be adjusted until there is no detection of a stall condition during normal operation. The thresholds thus generated $Vq^{EH}$ and $Vq^{EL}$ can be stored in EEPROM.

As used herein, the terms "processor" and "controller" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor or controller can be embodied in an application specific integrated circuit (ASIC), which can be an analog ASIC or a digital ASIC, in a microprocessor with associated program memory and/or in a discrete electronic circuit, which can be analog or digital. A processor or controller can contain internal processors or modules that perform portions of the function, operation, or sequence of operations. Similarly, a module can contain internal processors or internal modules that perform portions of the function, operation, or sequence of operations of the module.

Processor 100 is configured to compare the applied q-axis voltage Vq 72 to the thresholds $Vq^{EH}$ and $Vq^{EL}$ in order to detect a stall condition of the motor and thus, may be considered to include a so-called comparator. More particularly, processor 100 determines whether or not the applied q-axis voltage 72 is greater than the high threshold $Vq^{EH}$ or lower than the low threshold $Vq^{EL}$. It will be appreciated by those of ordinary skill in the art that the comparison function can be comprised of a digital circuit (e.g., processor 100) having an output signal with at least two states indicative of an input signal being above or below a threshold level, respectively, or a digital value being above or below a digital threshold value (or another digital value), respectively. Alternatively, such comparison function can be implemented with an analog comparator having a two-state output signal indicative of an input signal being above or below a threshold level.

Stall detector 30 can further include a timer 106 and a debounce filter 110 for use in generating stall condition signal 36. As will be explained further below, a stall condition of the motor can be detected if the applied q-axis voltage Vq 72 remains greater than the high threshold $Vq^{EH}$ or less than the low threshold $Vq^{EL}$ for more than a predetermined timeout interval of the timer 106. By "predetermined" it is meant that the value is set, or fixed, in the factory at the time of manufacture, or by external means, e.g., programming, thereafter. For example, the timeout interval may be user programmable. The stall detector 30 can be configured to reset the timer 106 if the applied q-axis voltage Vq 72 having been greater than the high threshold $Vq^{EH}$ then falls below the high threshold or if the applied q-axis voltage having been less than the low threshold $Vq^{EL}$ increases to exceed the low threshold.

Use of the debounce filter 110 can prevent misdetection of stall conditions during start-up and fast transient conditions when conditions may cause the applied q-axis voltage Vq 72 to exceed the high threshold $Vq^{EH}$ or fall below the low threshold $Vq^{EL}$ spuriously for reasons other than an actual motor stall condition. Debounce functionality will be described further below in connection with FIG. 2. Suffice it to say here that during start-up and under fast transient conditions, the applied q-axis voltage Vq 72 can rise quickly (e.g., because the applied q-axis voltage Vq is based in part on the estimated rotor position signal $\theta_r$, 82 and such estimate may not be accurate immediately following power up or during a transient) and the computed estimate of the q-axis voltage $Vq^E$ can lag slightly. Transient conditions can include but are not limited to going from a low speed to a maximum speed or a fast deceleration to a slow speed from a high speed for example. The combination of high threshold $Vq^{EH}$ and debounce filter time can prevent false detection of a stall condition during transient and start-up.

Stall detection in the described manner provides several advantages including, but not limited to stall detection during motor wobbling, detection of inaccurate sensorless control frequency lock, independence from motor parameter variation error (since a motor inductance parameter is not used), relatively low computational intensity and complexity, and improved detection accuracy under start-up and fast transient conditions by using debounce functionality.

It will be appreciated by those of ordinary skill in the art that the illustrated delineation of blocks and their functionality are illustrative only and that implementation of the stall detector 30 can be varied according to design considerations. Further, while electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

It will also be appreciated by those of ordinary skill in the art that components of the motor control system 10 can be implemented in various forms. For example, in some embodiments, the FOC controller 14 and the stall detector 30 are implemented in an integrated circuit (IC) as shown in the example motor controller of FIG. 3.

Figure 2:
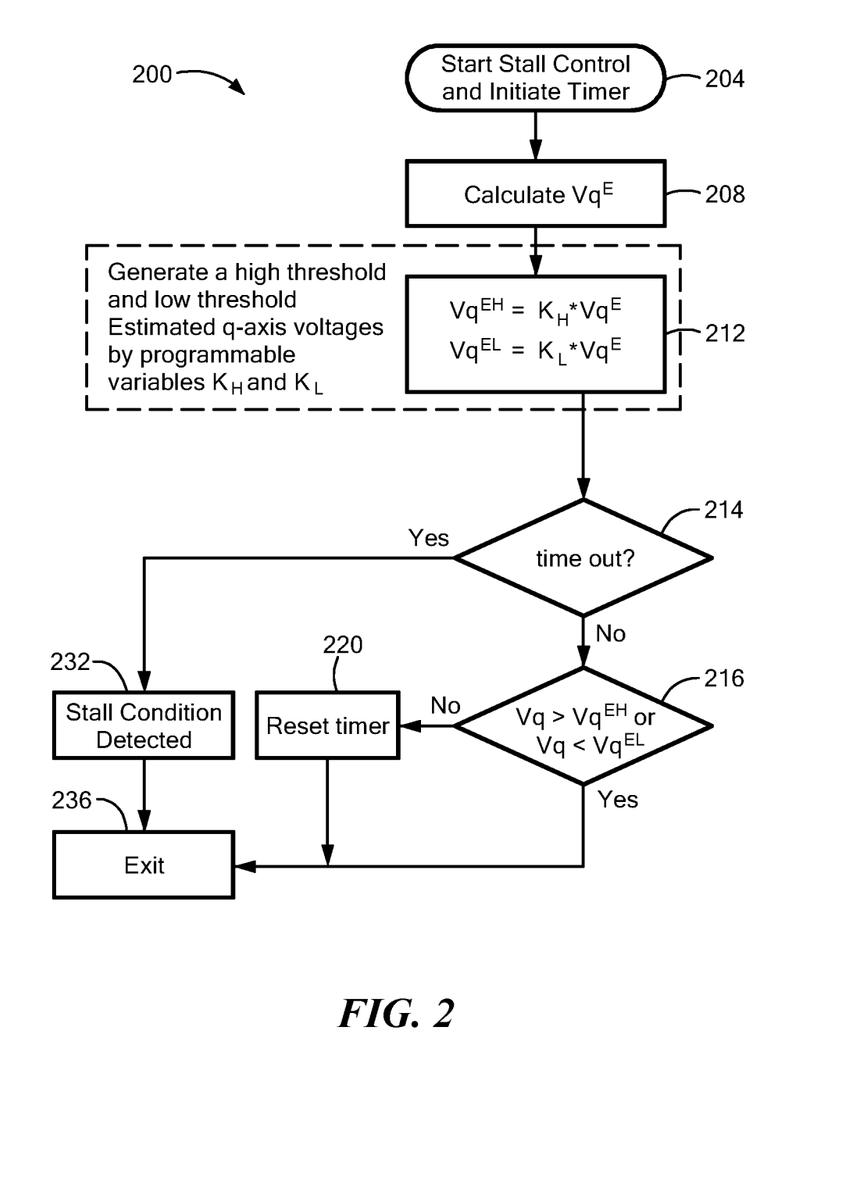
FIG. 2 is a flow diagram illustrating stall detection in the motor controller of FIG. 1.

Referring also to FIG. 2, a flow diagram of a method 200 for detecting a motor stall condition is shown. The method begins at bock 204 in which stall control commences and a timer (e.g., timer 106 in FIG. 1) is reset. The first time the method 200 is performed is when a command to run the motor is initiated. As noted, the stall detection process 200 can be performed at various times and at rates. For example, the process 200 can be performed once per motor control period.

At block 208, an estimate of the q-axis voltage $Vq^E$ is calculated as explained above in connection with equation (2). After the first time that the process 200 is performed (i.e., after the first PWM cycle), the process 200 commences with block 208 (i.e., the timer is not initiated again in block 204).

At block 212, one or more thresholds are generated. For example, high and low thresholds $Vq^{EH}$ and $Vq^{EL}$ may be generated based on the estimate of the q-axis voltage $Vq^E$ as described above in connection with equations (3) and (4), respectively.

At block 214, it is determined whether or not a timeout has occurred (i.e., whether or not the timer has reached a predetermined time). In an example embodiment, the timeout interval can be on the order of five PWM cycles. The timeout interval can be user programmable or predetermined or preset.

If the timeout has occurred, then a stall condition is detected at block 232, following which the stall control process terminates at block 236. Detection of the stall condition may include generating the stall signal 36 (FIG. 1).

If it is determined at block 214 that the timeout has not occurred, then the applied q-axis voltage Vq 72 (FIG. 1) is compared to the high and low thresholds $Vq^{EH}$, $Vq^{EL}$ at block 216 to determine if the applied q-axis voltage Vq 72 is greater than the high threshold $Vq^{EH}$ or less than the low threshold $Vq^{EL}$. If the applied q-axis voltage Vq 72 is not greater than the high threshold $Vq^{EH}$ and is not less than the low threshold $Vq^{EL}$, then the timer is reset at block 220. On the other hand, if it is determined at block 216 that the applied q-axis voltage Vq 72 is greater than the high threshold $Vq^{EH}$ or less than the low threshold $Vq^{EL}$, then the stall control process terminates at block 236.

With the described process 200, if the applied q-axis voltage Vq 72 is higher than high threshold $Vq^{EH}$ or lower than the low threshold $Vq^{EL}$ for longer than the programmable timeout period or interval, then a stall condition is detected; whereas, if the condition changes before the timeout period, then the timer is reset (at block 220), and a stall condition needs to be persistent for another full timeout period before detection of the stall condition is triggered. In this way, the method 200 provides a debounce function in order to avoid falsely detecting a stall condition, such as may be particularly likely to occur at start-up or in response to a transient condition.

When a motor stall condition occurs, the estimated q-axis voltage $Vq^E$ can be substantially higher or lower than the applied q-axis voltage Vq 72. Further, the q-axis current Iq 66 generally will be much higher than under normal operating conditions for a given applied q-axis voltage Vq. Thus, in this stall scenario, the q-axis voltage 72 will fall below the low threshold $Vq^{EL}$ and therefore the stall condition will be detected. In another scenario in which the applied motor speed is lower than the sensorless estimation, and the controller fails to see it (i.e., as may occur due to inaccurate sensorless control frequency lock), the estimated q-axis voltage $Vq^E$ will be large again (as it is based in part on the estimated motor speed according to equation 2) and therefore, the applied q-axis voltage Vq will fall below $Vq^{EL}$ again, thereby triggering a stall condition detection.

In a motor wobbling scenario in which the motor 40 wobbles back and forth, the q-axis current Iq 66 will be much higher than under normal operating conditions since the motor needs much higher torque each time the rotation direction changes. This scenario results in the applied q-axis voltage Vq 72 falling below the low threshold $Vq^{EL}$, thereby triggering a stall condition detection.

As noted above, during start-up and under fast transient conditions, the applied q-axis voltage Vq 72 can rise quickly (e.g., because the applied q-axis voltage Vq is based in part on the estimated rotor position signal $\theta_r$, 82 and such estimate may not be accurate immediately following power up or during a transient) and the computed estimate of the q-axis voltage $Vq^E$ can lag slightly. Under these conditions, the applied q-axis voltage Vq can exceed the high threshold $Vq^{EH}$, thereby triggering a stall detection.

It will be appreciated that the rectangular elements (typified by element 208) are herein denoted "processing blocks" and the diamond-shaped elements (typified by element 216) are herein denoted "decision blocks" and either or both may represent computer software instructions or groups of instructions. It should be noted that the flow diagram of FIG. 2 represents an example embodiment disclosed herein and variations which generally follow the process outlined, are considered to be within the scope of the concepts, systems and techniques described and claimed herein. Some or all of the blocks may represent operations performed by functionally equivalent circuits. Also, some blocks may be manually performed while other blocks may be performed by machine. The flow diagram does not depict the syntax of any particular programming language. Rather, the flow diagram illustrates the information one of ordinary skill in the art requires to fabricate circuits and/or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence described is illustrative only and in instances can be varied without departing from the spirit of the concepts described and/or claimed herein. Thus, unless otherwise stated, the processes described below are unordered meaning that, when possible, the actions shown in the diagrams can be performed in any convenient or desirable order, including simultaneously.

Figure 3:
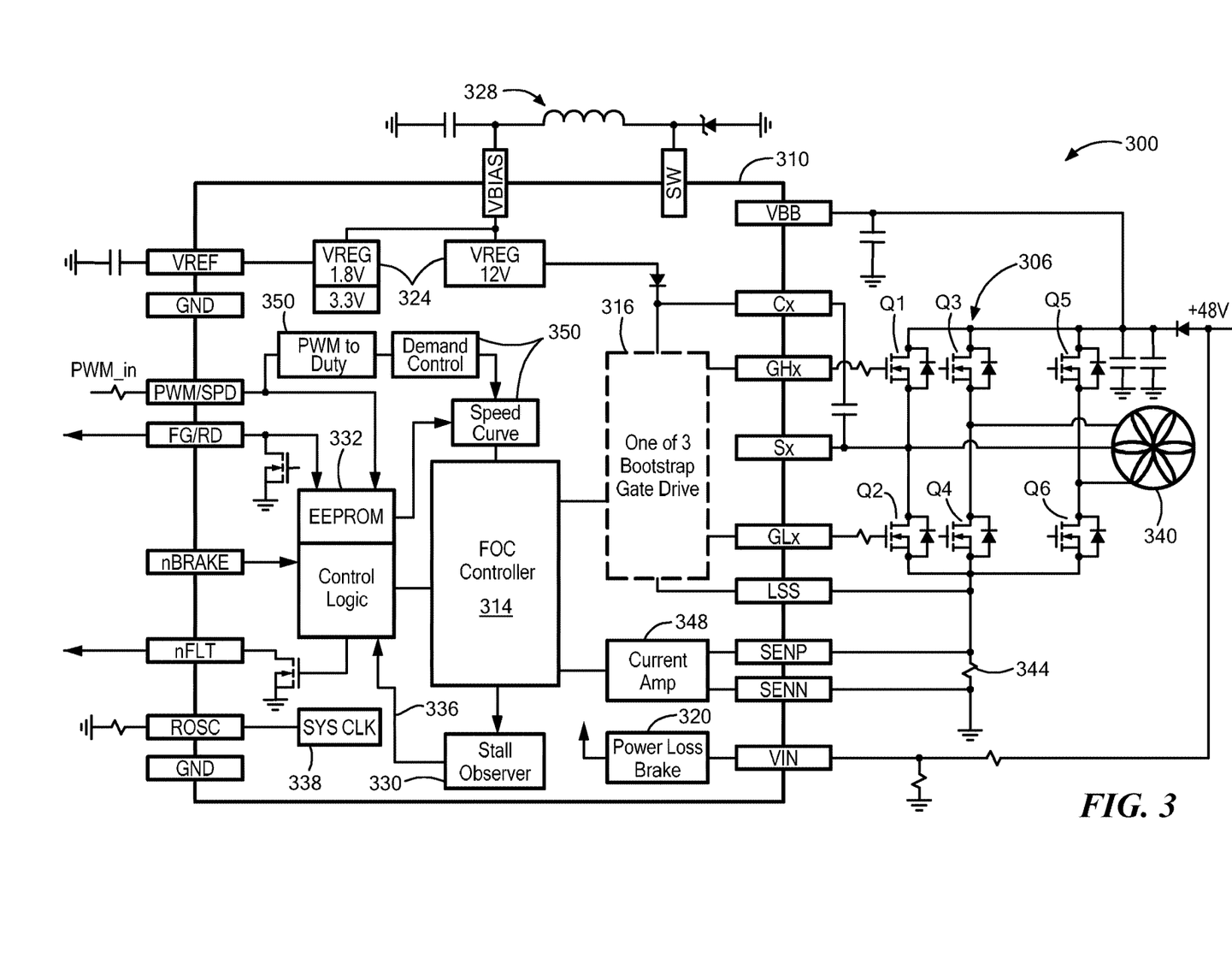
FIG. 3 is an example motor controller implementing the stall detection of FIG. 2.

Referring also to FIG. 3, an example motor control system 300 includes an FOC controller 314, an inverter 306, and a stall observer 330 arranged to control a motor 340. Motor control elements of the system 300 can be implemented in the form of an integrated circuit as represented by box 310 having connections (e.g., pins or terminals) for providing and receiving signals to and from other parts of the control system and to other external circuits and systems. The FOC controller 314 can be the same as or similar to FOC controller 14 of FIG. 1 and the stall observer 330 can be the same as or similar to stall observer 30 of FIG. 1. It will be appreciated by those of ordinary skill in the art that the delineation of which elements are internal versus external with respect to controller IC 310 can be varied.

Motor 340 has a plurality of windings and voltages are applied to the windings by the inverter 306. Although shown as a three-phase motor, motor 340 could include more or fewer phases, in which case motor controller 310 can be adapted to control a motor with more or fewer than three phases. The illustrated inverter 306 includes a plurality of switches Q1-Q6 (e.g., Field Effect Transistors, or FETs) arranged in half-bridge configurations, with each half-bridge (i.e., Q1/Q2, Q3/Q4, and Q5/Q6) generating a drive signal for a corresponding phase of the motor. A gate driver 316 can be the same as or similar to SVPWM circuit 16 of FIG. 1 and thus, provides control signals (i.e., PWM signals) to switches Q1-Q6 of the inverter 306 to control current through the motor windings in order to achieve a desired speed. PWM control signals can be selectively coupled to gate terminals of the switches Q1-Q6 through high side gate drive output terminal GHx and low side gate drive output terminal GLx. More particularly, power is provided to motor 340 by turning on an upper transistor (e.g., one of transistors Q1, Q3 and Q5) in a given half-bridge circuit to couple supply voltage VBB through the upper transistor to the motor, and turning on a lower transistor (e.g., one of transistors Q2, Q4 and Q6) in another half-bridge circuit to couple ground voltage GND through the lower transistor to motor, thereby allowing current to flow through a corresponding winding of motor.

The desired speed can be a user input provided at a speed control terminal PWM/SPD in the form of a PWM_in signal (as may be the same as or similar to speed demand signal Wr* 24 of FIG. 1). The PWM_in signal can be stored in EEPROM 332 and can be coupled to additional blocks 350 with which a selectable speed control mode is controlled. For example, in a PWM mode, motor speed can be controlled by a duty cycle of the PWM_in signal, in an analog mode, motor speed can be controlled by the amplitude of the analog voltage applied to the PWM/SPD pin, in a clock mode, motor speed can be controlled by the frequency of the input clock, and in a standby mode, all circuitry (other than the charge pump and VREG) can be turned off. Controller IC 310 can include a terminal LSS for coupling to the low side source of the switches, as shown.

Motor phase current can be sensed by a sense resistor 344 for coupling to the controller IC 310 at inputs SENP and SENN. A current amplifier 348 can amplify the sensed motor current for coupling the sensed current (that may be the same as or similar to current signal 28 of FIG. 1) to the FOC controller 314.

Controller IC 310 can receive a supply voltage at a VBB terminal as may be provided by an external +48V source. The supply voltage can also be coupled to a VIN terminal for coupling to a power loss brake unit 320 that can operate to slow down the motor 340 if there is a loss of input power. A bias voltage can be generated by an external inductor and capacitor and can be coupled to one or more regulators 324 through a VBIAS terminal. For example, the VBIAS terminal can be coupled to an external Buck regulator 328 including an inductor and capacitor as shown. A switch terminal SW can be coupled to a switch (not shown) of the Buck regulator 328. Regulators 324 can generate regulated voltages for powering on-chip circuitry and also for providing a reference voltage at a VREF terminal.

Controller IC 310 can include a memory and control logic block 332 as may include EEPROM or other type of non-volatile memory to store parameters related to operation of the motor 340 and control logic to store various values and parameters and control certain functions. Additional terminals of the controller IC 310 can include an FG/RD output at which speed information (FG) or rotation detection information (RD) can be provided based on a selectable function that can be programmed through EEPROM 332. An Nbrake terminal can receive an external signal to control motor braking function. A system clock reference signal can be received at an ROSC terminal for coupling to an internal system clock unit 338.

Faults can be reported at an nFLT terminal in response to signals from control logic 332. For example, stall detection can be reported at the nFLT terminal based on operation of the stall observer 330. Other faults may also be detected and reported, such as overcurrent, overvoltage, and undervoltage conditions.

Stall observer 330 (referred to herein alternatively as stall detector 330) is configured to calculate an estimate of the q-axis voltage $Vq^E$, generate one or more thresholds based on the estimated q-axis voltage, and compare the applied q-axis voltage Vq to a threshold in order to detect a stall condition of the motor. The stall detector 30 can include a threshold generator configured to generate a high threshold $Vq^{EH}$ and a low threshold $Vq^{EL}$ for comparison to the applied q-axis voltage Vq. With this arrangement, stall conditions of the motor 340 can be detected and a stall condition signal, or simply stall signal 336 can be generated to provide an indication of whether or not a stall condition has occurred. Stall signal 336 can be provided to control logic 332 for coupling to controller terminal nFLT.

All references cited herein are hereby incorporated herein by reference in their entirety.

Having described preferred embodiments, it will now become apparent to one of ordinary skill in the art that other embodiments incorporating their concepts may be used. Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims. For example, while a three-phase motor is described, the described principles and techniques apply to an electric motor having more than or fewer than three phases.

It is felt therefore that these embodiments should not be limited to disclosed embodiments, but rather should be limited only by the spirit and scope of the appended claims.

What is claimed is:

1. A motor control system for controlling operation of a motor having a plurality of windings, the motor control system comprising:
a gate driver to provide a control signal to one or more switching elements controlling a voltage applied to the plurality of windings;
a Field Oriented Control (FOC) controller configured to generate a PWM signal for coupling to the gate driver, wherein the FOC controller comprises a d-axis control loop configured to generate an applied d-axis voltage and a q-axis control loop configured to generate an applied q-axis voltage; and
a stall detector configured to calculate an estimate of the q-axis voltage based at least in part on an observed motor speed and an applied q-axis current and compare the applied q-axis voltage to a threshold that is generated based on the estimate in order to detect a stall condition of the motor.

2. The motor control system of claim 1, wherein the stall detector comprises a threshold generator configured to generate a high threshold and a low threshold based on the estimate of the q-axis voltage for comparison to the applied q-axis voltage.

3. The motor control system of claim 2, wherein the stall detector further comprises a timer and the stall detector is configured to reset the timer if the applied q-axis voltage becomes greater than the high threshold or less than the low threshold.

4. The motor control system of claim 3, wherein the stall condition of the motor is detected if the applied q-axis voltage remains greater than the high threshold or less than the low threshold for more than a predetermined timeout interval of the timer.

5. The motor control system of claim 4, wherein the stall detector is configured to generate a stall signal indicating the stall condition of the motor in response to detection of the stall condition.

6. The motor control system of claim 5, wherein the stall detector further comprises a debounce filter configured to generate the stall signal.

7. The motor control system of claim 1, wherein the stall detector is configured to calculate the estimated q-axis voltage according to the following:

$$V_q^E = RI_q + W_r K_t$$

where $W_r$ is the observed motor speed, $K_t$ is a BEMF constant, $I_q$ is the applied q-axis current, and R is a motor phase resistance.

8. The motor control system of claim 7, wherein the FOC controller further comprises a position and frequency observer configured to generate a motor position estimate θ and the observed motor speed $W_r$.

9. The motor control system of claim 8, further comprising a current measurement circuit coupled to one or more of the plurality of windings to measure a current through the one or more of the plurality of windings.

10. The motor control system of claim 1, wherein each of the d-axis control loop and the q-axis control loop of the FOC controller comprises a Proportional-Integral (PI) unit.

11. A method of detecting a stall condition in a motor having a plurality of windings, the method comprising:
   applying a controlled voltage to the plurality of windings;
   measuring a current through the one or more of the plurality of windings;
   generating, with a Field Oriented Control (FOC) controller that comprises a d-axis control loop configured to generate an applied d-axis voltage and a q-axis control loop configured to generate an applied q-axis voltage, a PWM signal for coupling to a gate driver that is configured to apply the controlled voltage to the plurality of windings;
   calculating an estimate of the q-axis voltage based at least in part on an observed motor speed and an applied q-axis current;
   comparing the applied q-axis voltage to a threshold that is generated based on the estimate of the q-axis voltage; and
   detecting a stall condition of the motor based on the comparison.

12. The method of claim 11, further comprising generating the threshold based on programable variables.

13. The method of claim 12, wherein generating the threshold comprises generating a high threshold based on a high programmable variable and generating a low threshold based on a low programmable variable.

14. The method of claim 13, wherein detecting the stall condition comprises resetting a timer when the applied q-axis voltage becomes less than the high threshold or greater than the low threshold.

15. The method of claim 14, wherein the stall condition of the motor is detected if the applied q-axis voltage remains greater than the high threshold or less than the low threshold for more than a predetermined timeout interval of the timer.

16. The method of claim 15, further comprising generating a stall signal indicating detection of the stall condition.

17. The method of claim 16, wherein generating the stall signal comprises using a debounce filter.

18. The method of claim 11, wherein calculating the estimated q-axis voltage comprises using the following:

$$V_q^E = RI_q + W_r K_t$$

where $W_r$ is the observed motor speed, $K_t$ is a BEMF constant, $I_q$ is the applied q-axis current, and R is a motor phase resistance.

19. A motor control system for controlling operation of a motor having a plurality of windings, the motor control system comprising:
   a Field Oriented Control (FOC) controller configured to generate a PWM signal for coupling to a gate driver based on a received demand signal, wherein the FOC controller comprises a d-axis control loop configured to generate an applied d-axis voltage and a q-axis control loop configured to generate an applied q-axis voltage; and
   means for detecting a stall condition of the motor based on a calculated estimate of the q-axis voltage, wherein the calculated estimate of the q-axis voltage is based at least in part on an observed motor speed and an applied q-axis current.

20. The motor control system of claim 19, wherein the stall condition detecting means comprises:
   means for calculating the estimate of the q-axis voltage;
   means for generating a threshold based on the estimate of the q-axis voltage; and
   means for comparing the applied q-axis voltage to the threshold.

* * * * *

UNITED STATES PATENT AND TRADEMARK OFFICE
CERTIFICATE OF CORRECTION

PATENT NO. : 11,387,756 B1
APPLICATION NO. : 17/161780
DATED : July 12, 2022
INVENTOR(S) : Kamyar Khosravi et al.

It is certified that error appears in the above-identified patent and that said Letters Patent is hereby corrected as shown below:

In the Specification

Column 2, Line 47 delete "Θand" and replace with --Θ and--.

Column 3, Line 58 delete "arranged control" and replace with --arranged to control--.

Column 4, Line 20 delete "circuity" and replace with --circuitry--.

Column 5, Line 27 delete "Vβare" and replace with --Vβ are--.

Column 8, Line 34 delete "bock 204" and replace with --block 204--.

Column 8, Line 38 delete "and at rates." and replace with --and rates.--.

Column 8, Line 48 delete "and $v_q^{EL}$" and replace with --and $Vq^{EL}$--.

Column 10, Line 54 delete "winding of motor." and replace with --winding of the motor.--.

Column 11, Line 32 delete "Nbrake" and replace with --nBRAKE--.

Column 11, Line 47 delete "30" and replace with --330--.

Signed and Sealed this
Nineteenth Day of September, 2023

Katherine Kelly Vidal
*Director of the United States Patent and Trademark Office*